United States Patent [19]

Sigai

[11] Patent Number: 5,223,341
[45] Date of Patent: Jun. 29, 1993

[54] PHOSPHOR CONTAINING BARIUM AND LEAD

[75] Inventor: A. Gary Sigai, Lexington, Mass.

[73] Assignee: GTE Products Corporation, Stamford, Conn.

[21] Appl. No.: 704,496

[22] Filed: May 23, 1991

[51] Int. Cl.⁵ .............................................. B32B 5/16
[52] U.S. Cl. ..................................... 428/403; 313/486; 313/489; 428/404
[58] Field of Search ............... 428/404, 403; 313/486, 313/489

[56] References Cited

U.S. PATENT DOCUMENTS

| | | | |
|---|---|---|---|
| 4,691,140 | 9/1987 | Sakakibara et al. | 313/489 |
| 4,803,400 | 2/1989 | Peters | 313/489 |
| 4,825,124 | 4/1989 | Sigai | 313/486 |
| 4,950,948 | 8/1990 | Peters | 313/486 |
| 5,049,408 | 9/1991 | Klinedinst et al. | 427/69 |
| 5,051,277 | 9/1991 | Sigai et al. | 427/69 |

Primary Examiner—Paul J. Thibodeau
Assistant Examiner—D. S. Nakarani
Attorney, Agent, or Firm—Carl Ruoff; Robert E. Walter

[57] ABSTRACT

A phosphor of the type utilized in a fluorescent lamp and which includes core elements barium, lead, silicon, and oxygen where a continuous, conformal outer coating of hydration and solubilization resistant aluminum oxide, which is impermeable to migration of the core elements, surrounds the core whereby the outer surface of the core is substantially entirely free of the core elements.

12 Claims, No Drawings

PHOSPHOR CONTAINING BARIUM AND LEAD

FIELD OF THE INVENTION

This invention relates to phosphors containing barium and lead having enhanced properties for protecting the environment.

BACKGROUND OF THE INVENTION

Barium silicate doped with lead ($BaSi_2O_5$:Pb) is widely used in speciality fluorescent lamps, particularly for tanning applications.

While the spectral properties of this phosphor make it well suited for fluorescent lamp tanning applications, the one major disadvantage in its use is that it contains toxic elements which may ultimately leach into the environment as waste waters during lamp manufacturing or after the disposal of expended lamps after their useful life. As the demand for these lamps increases, there are environmental concerns due to the presence of barium and lead in the phosphor. Methods and phosphors which reduce or eliminate these environmental concerns are highly desirable.

U.S. Pat. No. 4,691,140 to Sakakibara et. al. describes a glass bulb with a $BaSi_2O_5$:Pb phosphor coating layer where alumina particles having an average diameter of 0.01 to 0.1 $\mu$m act as a protective coating between the phosphor and the glass. As set forth, the coating reduces interaction with the glass and subsequent reduction in luminous efficiency of the fluorescent lamp. The coatings are prepared by baking a dispersion of alumina with a binder in an organic solvent after applying the dispersion to the inside of a bulb. Although the coating is set forth as having enhanced luminous efficiency, such a coating does not address environment concerns.

U.S. Pat. No. 4,950,948 to Peters, et. al. relates to a manganese zinc silicate phosphor which can be coated with a continuous, conformal, nonparticulate aluminum oxide coating and annealed to improve its maintenance in a fluorescent lamp. The aluminum oxide coating is formed by a chemical vapor deposition process within a fluidized bed of the phosphor powder using trimethyl aluminum and oxygen as the reactants. The purpose of the annealing of the coated phosphor, as described in U.S. Pat. No. 4,803,400 to Peters and Hunt, is to prevent hydration/solubilization of the oxide coating. It is an essential step to stabilizing the coating since water is the principal agent in the destruction of the alumina (see column 3, lines 55-56 of that patent). Unfortunately, as described in '948, the thermal annealing process which bonds the alumina coating to the phosphor particle has the undesirable side effect of promoting the interdiffusion of chemical species which make up the coating and phosphor substrate (see column 10, lines 52-56). Even the earliest patent which first describes the annealing process ('400) refers to the migration of zinc via diffusion through the coating as determined by XPS, X-ray Photoelectron Spectroscopy, which is a powerful technique for determining the chemical composition of the surface of an annealed alumina coated zinc silicate phosphor (see Example 2, column 5, lines 40-43).

U.S. Pat. No. 4,999,219 to Klinedinst and Gary describes another method of producing a continuous, conformal, non-particulate aluminum oxide coating which employs aluminum isopropoxide as the precursor in a fluidized bed. XPS elemental surface analysis of the alumina coated zinc silicate particles show no zinc, silicon, or manganese. However, upon annealing, zinc and manganese in substantial quantity are detected. This has been attributed to these elements diffusing from the surface of the phosphor contacting the alumina coating during the anneal. Subsequent detailed XPS analyses have shown that tungsten, which is originally used in the synthesis of the phosphor, also migrates through the alumina coating. Patent '219 also notes that "similar results were obtained with alumina-coated ,cool-white, (i.e., calcium halophosphate) phosphor". Therefore, it appears that elements of base phosphors are highly mobile during the annealing process used to bond the alumina coating to the phosphor substrates and can easily migrate to the surface of the alumina coated phosphors.

To be effective in preventing the leaching of elements from the phosphor of environmental concern, it is desirable that the core elements of the phosphor do not migrate through to the outer surface of the encapsulating coating used to protect it.

Heretofore, environmental concerns have concentrated on the extraction of mercury from lamps after their useful life. Industry and the prior art have not focused on environmental concerns relating to lamps of the above nature containing lead and barium.

SUMMARY OF THE INVENTION

It is, therefore, an object of the present invention to obviate the disadvantages of the prior art.

It is still another object of the invention to provide a process containing barium and lead having enhanced properties for protecting the environment.

It is another object of the invention to provide a barium silicate doped with lead for use in speciality fluorescent lamps, particularly for tanning applications.

In accordance with one aspect of the present invention, there is provided a particle of phosphor of the type having a coated core and for use in a fluorescent lamp wherein said core comprises core elements of barium, lead and silicon, said core having a continuous conformal outer coating of substantially hydration and solubilization resistant aluminum oxide surrounding said core, said coating being impermeable to migration of said core elements and having an outer surface entirely free of said core elements.

Since it is desirable for the outer surface of the final particle to be entirely free of elements that may deleteriously affect the environment, it is desirable that the core elements not include those that may undesirably migrate to the outer surface of the coating. Hence, in accordance with another aspect of the present invention, diffusible elements are preferably not included in the core. Typical diffusible elements, while not environmentally hazardous, comprise manganese, zinc, and tungsten.

Also, in accordance with a more preferred aspect of the present invention, a particle of fluorescent lamp phosphor for emitting radiation for skin tanning comprising a core of lead activated barium silicate containing core elements comprising barium, lead, silicon and oxygen, said core having a continuous conformal outer coating of substantially hydration and solubilization resistant aluminum oxide surrounding said core, said coating being impermeable to migration of said core elements and having an outer surface entirely free of said core elements.

The barium silicate phosphor of the present invention has reduced leaching characteristics relative to the presence of environmentally detrimental barium and lead. This is achieved by the application of a microencapsulating coating of alumina.

BEST MODE FOR CARRYING OUT THE INVENTION

For a better understanding of the present invention, together with other and further objects, advantages and capabilities thereof, reference is made to the following disclosure and appended claims.

In a preferred embodiment, the continuous aluminum oxide coating is deposited by chemical vapor deposition in a fluidized bed, e.g., an aluminum containing precursor material is deposited on the outer surface of phosphor powder particles while the particles are suspended in an inert gas stream and the aluminum-containing precursor material is reacted to form aluminum oxide. Examples of suitable precursors of the aluminum-containing compounds include alkyl aluminum compounds; aluminum alkoxides; and aluminum acetylacetonates.

In the preferred embodiment, the fluidized bed is formed by passing an inert gas through the phosphor particles in order to suspend the particles in the inert gas stream. Examples of inert gases suitable for use in this method include nitrogen, argon, helium, neon, or mixtures thereof. In addition to supporting the phosphor particles in a fluidized bed, the inert gas functions as a carrier gas. A volatizable aluminum containing coating precursor material is vaporized into the inert gas before the inert gas enters the reaction chamber in which the phosphor particles become suspended. Preferably the carrier gas is saturated with the vapor of the aluminum containing coating precursor material. As the carrier gas containing the vaporized aluminum containing coating precursor material passes upwardly through the phosphor particles, the precursor material or its subsequent intermediate products are reacted to form a continuous, conformal, non-particulate coating on the surface of the individual particles.

An oxidizing gas, if necessary, is introduced into the fluidized bed separately from the carrier gas containing the vaporized coating precursor material. The use of an oxidizing gas is optional when an oxygen-containing precursor material is used. Examples of suitable oxidizing gases are air or oxygen. The oxidizing gas may be mixed with a diluent inert gas.

The thickness of the coating is dependent upon the amount of time the process is run, the temperature of the evaporation source, the flow rate through the evaporation source, and the surface area of the phosphor.

To produce a hydration and solubilization resistant aluminum oxide, the coated phosphor particles are annealed in an air atmosphere at a temperature of from about 700° C. to about 850° C. for a period of from about 15 minutes to about 20 hours. Preferably, the coated phosphor particles are annealed in air at a temperature of from about 750° C. to about 800° C. for a period of from about 4 to about 16 hours; and most preferably at a temperature of from about 760° to about 770° C. for about 4 hours. The technique for coating phosphors utilizing a chemical vapor deposition process as described in U.S. Pat. No. 4,950,948 to Peters et. al. is incorporated by reference into the present specification. The annealed coating, which includes partially crystalline aluminum oxide, includes a spinel alumina phase.

There are specific limits established by the EPA for the maximum concentration of contaminants which can be tolerated before it must be regarded as and handled as toxic waste. The procedure for this assessment, known as an EP (extraction procedure) toxicity test consists of exposing the phosphor to an acidic solution of pH 5.0 attained by readjustment of the acidity by continuous addition of acetic acid until this pH is maintained. The liquid is then extracted after a 14-hour exposure and analyzed for trace concentrations of the toxic elements to determine if they exceed established limits.

Table 1 shows the extraction concentrations for virgin, alumina coated, and alumina coated and annealed barium silicate phosphor. The coating thickness is phosphor is 150 angstroms and the phosphor is annealed for 4 hours at 750° C. The current EPA limits for barium and lead are 100 ppm and 5 ppm, respectively. These data show that the coated, and coated and annealed phosphor show major reductions in the extractable barium and lead. While the unannealed coated phosphor shows a reduction in leaching of barium and lead, these levels are not sustained upon repeated testing because of the known hydrolysis and solubilization of the alumina coating on standing. It can be expected that as tighter restrictions are placed on the maximum concentrations of these contaminants, these can be achieved by thicker coatings and modification of the annealing conditions (for example, temperature and time), or elimination of uncoated "fines" fraction which contaminate the fully coated phosphor when the powder is removed from the fluidized bed after coating.

TABLE 1

| Summary Of Extractable Toxic Elements From Lead Doped Barium Silicate Microencapsulated With Alumina | | |
|---|---|---|
| Powder Type | Ba (ppm) | Pb (ppm) |
| Virgin | 170.0 | 0.28 |
| Alumina Coated | 3.8 | <0.1 |
| Alumina Coated and Annealed | 9.9 | <0.1 |
| EPA Limits | 100.0 | 5.0 |

Particles of UV-emitting lead-doped barium silicate phosphor Type No. 2011 obtained from the Chemical and Metallurgical Division of GTE Products Corporation, Towanda, PA, were coated with a non-particulate, conformal coating of aluminum oxide. The surface area of this phosphor was determined to be 0.64 sq meters/gram, as measured by single-point BET on a Quantachrome Monosorb surface area instrument.

Approximately 1500 grams of phosphor with about 0.5% by weight of a fluidizing aid such as Aluminum Oxide C, available from Degussa, Inc., was loaded into a fluid bed column comprising a 80 millimeter ID quartz tube having a quartz frit fused to the bottom, acting as a distributor plate. A 65 millimeter stainless steel agitator disc was positioned inside the quartz tube. The agitator disc was attached to a vibromixer agitator. Approximately 50 millimeters from the base of the agitator, a two-micron stainless steel filter element was welded in line and functioned as the diffuser of the oxygen mixture. The agitator disc itself was located approximately 25 millimeters above the quartz distributor. A series of approximately eleven copper coil windings of ¼ tubing were located immediately around the frit located at the bottom of the quartz tube, such that one coil was below the distributor plate. In addition, there was a copper foil of approximately 120 millimeters which was sandwiched between the cooling coil and the quartz tube to provide improved heat transfer, and there was insulation located above the copper coiled windings to further reduce heat transfer between the heated and unheated portions of the tube. This insulation comprised approximately 50 millimeters of 1" wide by ½ thick Fiberfax roll insulation. The edge of the Fiberfax insulation matched exactly the level between the unheated and heated part of the three-zone Lindberg furnace, that is, between the bottom and center zones of the furnace. The furnace zones were 6", 12", and 6" in length, and a spike thermocouple was located at the midpoint of each zone. The first two furnace zones were set between 500° and 550 °C. and the last zone was shut off. The bed temperature was recorded by a thermocouple located within the bed half way between the distributor plate and the top of the expanded bed. The gases that pass through the distributor plate at the bottom of the quartz column had flow rates of 1750 cc/min. of an inert gas such as nitrogen for the bubbler, and 2500 cc/min. of the inert gas for the carrier. A fluidized bed was formed by passing the inert gas upwardly through the phosphor particles in order to suspend the particles in the inert gas stream. In addition to supporting the phosphor particles in a fluidized bed, the inert gas functioned as a carrier for the vaporized trimethyl aluminum. The inert gas was passed through the bubbler containing trimethyl aluminum at approximately 30 °C. and the trimethyl aluminum was vaporized into the inert gas before passing through the distributor plate into the fluidized phosphor bed. A continuous protective alumina coating was formed on the surface of the individual phosphor particles when the vaporized trimethyl aluminum was exposed to the oxygen at a temperature sufficient for a reaction between the oxygen and the vaporized trimethyl aluminum to occur. The oxygen, as an oxygen/inert gas mixture, was introduced at 3000 cc/min. for oxygen and 50 cc/min. for nitrogen into the fluidized bed through the two-micron filter element located on the shaft of the vibrating mixer above the vibrating disc. The coating time was 6 ¼ hours.

Once the particles of the phosphor were coated with a continuous coating of alumina, the alumina-coated phosphor powder was transferred into a quartz boat of dimensions 2 ¼ inches (height), 4 inches (width), and 10 inches (length). The powder loading was 750 grams. The boat was inserted into a six-inch diameter MAXIBRUTE tube furnace which was purged with 1 ½ liters per minute of air. The furnace was then brought up to the annealing temperature from room temperature in about an hour. The annealing temperature, as measured by a calibrated thermocouple embedded in the powder, was about 750 °C. The powder remained at temperature for 4 hours and then was allowed to cool overnight.

High resolution Scanning Electron Microscopy (SEM) of the coated and coated and annealed phosphor particles showed that the aluminum oxide coating is conformal. The coating growth is enhanced where fluidizing aid particles had adhered to the phosphor particle surface during the fluidizing and coating process. The surface chemistry of the virgin, coated, and coated and annealed lead-doped barium silicate phosphor were determined by X-ray Photoelectron Spectroscopy (XPS). The atomic percentages of the surface elements are listed in Table 2. The data for the coated phosphor confirm the continuity of the coating by the complete attenuation of the barium and lead signals with the presence of only aluminum and oxygen. Carbon found in all samples is attributed to residual contamination of the surface which is common in XPS analysis. In the case of the annealed coated phosphor, the surface is completely free of barium and lead, indicating that these elements are immobile with respect to migration from the barium silicate base phosphor through the alumina coating during the anneal.

TABLE 2

Surface Analyses of the Virgin, Coated, and Coated and Annealed Lead-doped Barium Silicate Phosphors Determined by X-ray Photoelectron Spectroscopy (XPS)

| | Atomic Percentages | | | | | |
|---|---|---|---|---|---|---|
| | Si | Al | O | Ba | Pb | C |
| Virgin | 30.8 | 0 | 52.6 | 10.5 | 0.31 | 5.8 |
| Coated | 0 | 38.9 | 51.0 | 0 | 0 | 10.1 |
| Coated/Annealed | 0 | 42.7 | 53.0 | 0 | 0 | 4.2 |

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The actual scope of the invention is intended to be defined in the following claims when viewed in their proper perspective based on the prior art.

What is claimed is:

1. A particle of fluorescent lamp phosphor for emitting radiation for skin tanning comprising a core of lead activated barium silicate containing core elements comprising barium, lead, silicon and oxygen, said core having a continuous conformal annealed outer coating of substantially hydration and solubilization resistant aluminum oxide surrounding said core, said coating being impermeable to migration of said core elements and having an outer surface entirely free of said core elements.

2. A particle of fluorescent lamp phosphor for emitting radiation for skin tanning in accordance with claim 1 wherein said core elements consist entirely of barium, lead, silicon and oxygen.

3. A particle of fluorescent lamp phosphor for emitting radiation for skin tanning in accordance with claim 2 wherein said outer coating includes partially crystalline aluminum oxide.

4. A particle of fluorescent lamp phosphor for emitting radiation for skin tanning in accordance with claim 3 wherein said outer coating includes a spinel alumina phase.

5. A particle of fluorescent lamp phosphor for emitting radiation for skin tanning in accordance with claim 4 wherein said outer coating is impermeable to migration of said core elements when treated with an aqueous acid solution having a degree of acidity less than the degree of acidity required for decomposing said coating.

6. A particle of phosphor of the type having a coated core and for use in a fluorescent lamp wherein said core comprises core elements of barium, lead and silicon, said core having a continuous conformal annealed outer coating of substantially hydration and solubilization resistant aluminum oxide surrounding said core, said coating being impermeable to migration of said core elements and having an outer surface entirely free of said core elements.

7. A particle of phosphor in accordance with claim 6 wherein said core elements comprising barium, silicon and oxygen are in the form of a barium silicate.

8. A particle of phosphor in accordance with claim 7 wherein said outer coating consists essentially of an amorphous coating having been annealed.

9. A particle of phosphor in accordance with claim 8 wherein said outer coating includes partially crystalline aluminum oxide.

10. A particle of phosphor in accordance with claim 9 wherein said outer coating includes a spinel alumina phase.

11. A particle of phosphor in accordance with claim 10 wherein said outer coating is impermeable to migration of said core elements when treated with an aqueous acid solution having a degree of acidity less than the degree of acidity required for decomposing said coating.

12. A particle of phosphor of the type utilized in a fluorescent lamp and characterized by the absence of manganese, tungsten and zinc comprising a core of core elements comprising barium, lead, silicon and oxygen, said core having a continuous, conformal annealed outer coating of substantially hydration and solubilization resistant aluminum oxide surrounding said core, said coating being impermeable to migration of said core elements and having an outer surface entirely free of said core elements.

* * * * *